(12) United States Patent
Hipp et al.

(10) Patent No.: US 6,744,620 B2
(45) Date of Patent: Jun. 1, 2004

(54) CAPACITOR HAVING AN ADHESION LAYER AT THE CATHODE CONTACT

(75) Inventors: Thomas Hipp, Langenau (DE); Peter Berendt, Heidenheim (DE)

(73) Assignee: EPCOS AG, Munich (DE)

(*) Notice: Subject to any disclaimer, the term of this patent is extended or adjusted under 35 U.S.C. 154(b) by 0 days.

(21) Appl. No.: 10/260,653

(22) Filed: Sep. 30, 2002

(65) Prior Publication Data
US 2003/0165045 A1 Sep. 4, 2003

(30) Foreign Application Priority Data
Mar. 1, 2002 (DE) .................................. 202 03 300 U

(51) Int. Cl.⁷ .............................................. H01G 9/04
(52) U.S. Cl. ................ 361/516; 361/517; 361/535; 29/25.03
(58) Field of Search ................ 361/508–510, 361/516, 517–519, 528–529, 532–534, 535–537; 29/25.03

(56) References Cited

U.S. PATENT DOCUMENTS

| | | | |
|---|---|---|---|
| 4,039,904 A | | 8/1977 | Klein et al. |
| 4,107,762 A | * | 8/1978 | Shirn et al. ............ 361/534 |
| 4,417,298 A | | 11/1983 | Nakata et al. |
| 4,558,399 A | | 12/1985 | Toyama et al. |
| 5,053,927 A | * | 10/1991 | Baker et al. ............ 361/534 |

FOREIGN PATENT DOCUMENTS

| | | |
|---|---|---|
| DE | 198 46 936 | 3/2000 |
| EP | 1 024 507 | 8/2000 |
| JP | 7-22283 | 7/1995 |

* cited by examiner

Primary Examiner—Anthony Dinkins
(74) Attorney, Agent, or Firm—Schiff Hardin LLP

(57) ABSTRACT

A capacitor comprises an anode body that is surrounded by a housing, an anode contact projecting out of the inside of the anode body, and a cathode contact proceeding along the upper side of the anode body, this cathode contact having its housing side coated with an adhesion layer. As a result of the adhesion layer, the risk of the formation of bubbles and, thus, the risk of a tearing of the housing is alleviated.

11 Claims, 1 Drawing Sheet

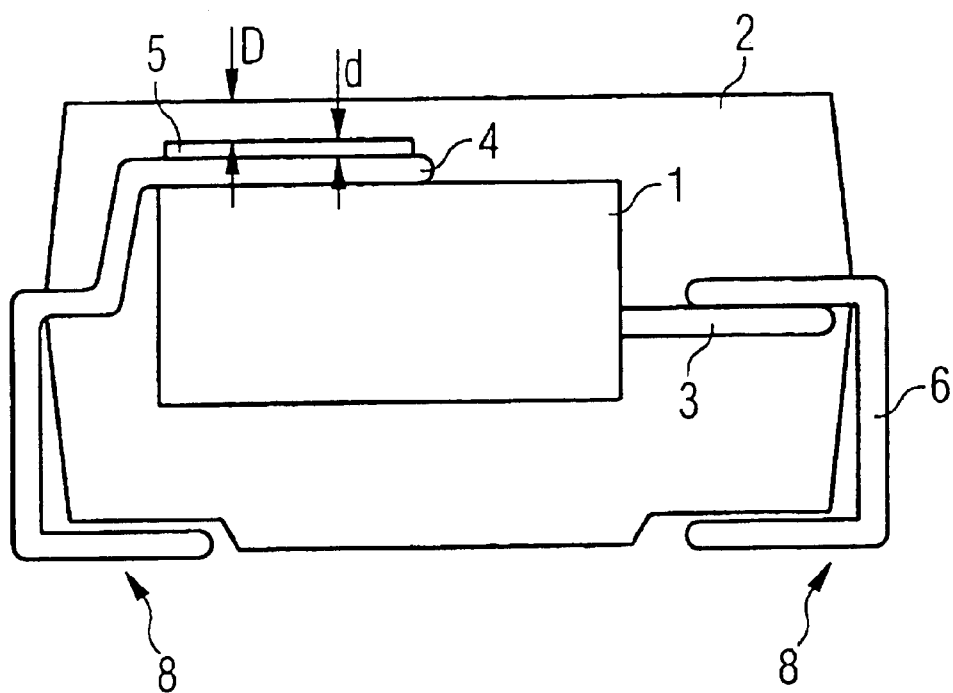
FIG

CAPACITOR HAVING AN ADHESION LAYER AT THE CATHODE CONTACT

BACKGROUND OF THE INVENTION

1. Field of the Invention

The invention is directed to an electrolytic capacitor having an anode body that is surrounded by a housing. A cathode contact is located on an upper side of the anode body.

2. Description of the Related Art

The German patent document DE 198 46 936 C1 discloses capacitors of the initially cited species in which the anode body is a porous sintered body of tantalum powder. An anode contact projects from the inside of the anode body. A. cathode contact that is electrically conductively connected to the outside of the anode body is located on the upper side of the anode body. The anode body is extrusion-coated with a plastic housing.

The known tantalum electrolytic capacitors have the disadvantage that bubbles often form between the housing and the cathode contact during manufacture of the housing. The creation of these bubbles is explained by a sudden change in the coefficient of thermal expansion of the epoxy duroplastics usually employed for the extrusion coating in the range of the glass transition temperature of these duroplastics. This glass transition temperature is reached in the extrusion-coating of the anode body with the plastic or is even exceeded during this process. Due to the sudden, pronounced thermal expansion of the plastic mass, bubbles easily arise at the surface of the component where the thickness of the housing is relatively slight, i.e. the housing layer located over the cathode contact separates from it. Moisture can easily deposit in the cavity formed by the bubbles and this can lead to a sudden tearing of the housing due to sudden vaporization given thermal stressing of the capacitor. In addition, the housing can also easily tear at the location of the bubble given external mechanical stresses.

Another condition promotes the formation of bubbles. The plastics employed for the extrusion-coating of the anode body usually contain an adhesion-reducing agent in the form of waxes or in the form of phenols. This agent permits the plastic, following the extrusion-coating of the anode body, to easily detach from the injection molding tool in the form of an injection mould that is employed for the extrusion coating. Iron materials are usually employed for injection moulds. Accordingly, the adhesion reducing agents employed in the plastic mass are suitable for reducing the adhesion of the plastic on iron surfaces. Since, over and above this, the cathode contacts also usually contain iron, the adhesion of the housing is also reduced at the surface of the cathode contact.

Attempts have previously been made to solve the problem of bubble formation in that the wall thickness of the housing above the cathode contact constructed with a relatively great thickness. Due to its mechanical stability, a high wall thickness can prevent the formation of the bubble. This measure, however, has the disadvantage that it deteriorates the volume utilization of the capacitor, i.e., the capacitance available per volume.

Another solution to the problem that has been previously attempted is to provide a further process step in which the housing is hardened afterwards. This attempted solution has the disadvantage that an additional process step is needed that increases the manufacturing costs for the component.

SUMMARY OF THE INVENTION

An object of the present invention is to provide a capacitor of the species initially cited in which the risk of a lift-off of the housing part lying above the cathode contact is diminished.

This object is achieved by a capacitor and an appertaining method of manufacturing a capacitor, the capacitor comprising: a housing; an anode body that is surrounded by the housing; an anode contact projecting out of an inside of the anode body; an adhesion layer; and a cathode contact proceeding along an upper side of the anode body, the cathode contact having its housing side coated with the adhesion layer.

Advantageous developments of the invention include where the housing comprises an injection-moldable plastic, which may contain an agent that reduces adhesion of the plastic to ferriferous surfaces. The anode body may be extrusion-coated by the housing. The cathode contact may be formed of a ferriferous material of a system carrier. The cathode contact may be configured in a sheet metal strip shape. The adhesion layer may be galvanically applied on the cathode contact. The adhesion layer may be 0.1 through 0.5 $\mu$m thick. The adhesion layer may comprise silver. And the housing over the cathode contact may be 2 through 5 mm thick.

A capacitor is provided that comprises an anode body. The anode body is surrounded by a housing. Furthermore, an anode contact is conducted out of the inside of the anode body, this anode contact projecting from the inside of the anode body. Additionally, the capacitor comprises a cathode contact proceeding along the upper side of the anode body, this cathode contact being coated with an adhesion layer.

By providing an adhesion layer at the housing side of the cathode contact, the adhesion of the housing to the cathode contact can be improved and the risk of bubble formation can also be reduced.

In particular, the housing can contain an injection-moldable plastic, this offering the advantage that the housing can be simply and cost-beneficially manufactured in great numbers using injection molding.

Furthermore, the injection-moldable plastic can contain an agent that reduces the adhesion of the plastic at iron-containing surfaces. Such an agent can, for example, be a wax or one or more phenols as well. This type of agent makes it possible to manufacture the housing of the capacitor with ferriferous injection moulds.

An anode body that is extrusion-coated by the housing is obtained by extrusion-coating the anode body with an injection-moldable plastic.

Advantageously, the cathode contact can be formed of the ferriferous material of a system carrier. System carriers are advantageously employed in order to manufacture a plurality of capacitors in great numbers in a simple and economical way. The basis is formed by a band-shaped system carrier to which a plurality of anode bodies is secured. After being detached, the anode bodies are extrusion-coated with the injection-moldable plastic. System carrier materials that are composed of iron or are at least ferriferous are usually employed. For example, a system carrier material could be composed of iron/nickel steel.

The cathode contact can advantageously comprise the shape of a sheet metal strip as can be acquired from a system carrier in standard processes. Such a sheet metal strip also has the advantage that a relatively large contact surface is available for the contacting of the cathode contact to the anode body of the capacitor.

For example, silver, copper, tin or even lead can be employed as a material for the adhesion layer. In general, all materials that improve the adhesion of the cathode contact to the housing are suitable. When using a plastic that contains an agent that reduces the adhesion of the plastic at ferriferous surfaces, particular care must be exercised to see that the adhesion layer covering the cathode contact contains very little or even no iron.

Experiments with system carriers already provided with an adhesion layer before the detaching have shown specifically that silver is especially well-suited as material for the adhesion layer. Silver has the advantage that, first, it does not melt that easily or volatilize in the relatively high temperatures occurring during operation of the capacitor and, thus, can also not emerge from the capacitor. Furthermore, its has been shown that silver has an adequate bendability characteristic or flexibility, which is required for bringing the capacitor formed of the system carrier into its final shape by bending the cathode contact.

Advantageously, the adhesion layer can be galvanically applied on the cathode contact. Such a galvanic process has the advantage that a plurality of cathode contacts or system carries can be simultaneously coated in a single electroplating bath.

Advantageously, the adhesion layer may be 0.1 through 0.5 $\mu$m thick. A thinner adhesion layer might risk deterioration of the adhesion to the housing. Particularly when using silver for the adhesion layer, thicker adhesion layers have the disadvantage that high costs are incurred for their manufacture.

As a result of providing the adhesion layer at the housing side of the cathode contact, the thickness of the housing over the cathode contact can be reduced, resulting in an advantageous aspect that the thickness of the housing over the cathode contact may be 2 through 5 mm.

DESCRIPTION OF THE DRAWING

The invention is explained in greater detail below on the basis of an exemplary embodiment and the appertaining FIGURE. The FIGURE shows a schematic crossection through a capacitor by way of example.

DETAILED DESCRIPTION OF THE INVENTION

The capacitor comprises an anode body 1 that is porous and manufactured by pressing a tantalum powder. In the manufacture of the anode body 1, for example, pressing is carried out around an anode contact in the form of a wire or in the form of sheet tantalum. This anode contact 3 projects from the inside of the anode body 1. The anode contact 3 is contacted with an anode terminal 6 toward the outside. This contacting can be implemented, for example, by welding or soldering. The anode terminal 6 forms a solder surface 8 by being bent over at the outside of the housing 2 at the underside of said housing 2. The anode body 1 is extrusion-coated by the housing 2. The housing 2 contains an injection-moldable plastic, (e.g., an epoxy duroplastic), that in turn also contains adhesion-reducing agents in the form of waxes or phenols. A cathode contact that is electrically contacted to the anode body 1 is arranged on the upper side of the anode body 1. The fastening of the cathode contact 4 on the upper side of the anode body 1 takes place by gluing with silver conductive paste.

An adhesion layer 5 that comprises a thickness d between 0.1 and 0.5 $\mu$m may be arranged on the upper side of the cathode contact 4. The thickness D of the housing 2 over the cathode contact 4 can be 1 through 10 mm. The cathode contact 4 is formed of a part of a leadframe and has the shape of a sheet that is bent around the housing 2 at the outside of the housing 2 and forms a solder surface 8 at the underside of the housing 2.

The invention is not limited to tantalum electrolytic capacitors but can be contained in any type of capacitor that contains valve metal or would benefit from an architecture according to the present invention.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. For the sake of brevity, conventional capacitor design and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

| LIST OF REFERENCE CHARACTERS | |
|---|---|
| 1 | anode body |
| 2 | housing |
| 3 | anode contact |
| 4 | cathode contact |
| 5 | adhesion layer |
| 6 | anode terminal |
| 8 | solder surface |
| d | thickness of the adhesion layer |
| D | thickness of the housing |

What is claimed is:

1. A capacitor, comprising:

a housing;

an anode body that is surrounded by the housing;

an anode contact projecting out of an inside of the anode body;

a cathode contact proceeding along an upper side of the anode body;

an adhesion layer arranged between and in direct contact with the cathode contact and the housing to improve adhesion between the cathode contact and the housing.

2. The capacitor according to claim 1, wherein the housing comprises an injection-moldable plastic.

3. A capacitor, comprising:

a housing;

an anode body that is surrounded by the housing;

an anode contact projecting out of an inside of the anode body;

an adhesion layer; and a cathode contact proceeding along an upper side of the anode body, the cathode contact having its housing side coated with the adhesion layer;

wherein the housing comprises an injection-moldable plastic; and wherein the injection-moldable plastic contains an agent that reduces adhesion of the plastic to ferriferous surfaces.

4. The capacitor according to claim 1, wherein the anode body is extrusion-coated by the housing.

5. A capacitor, comprising:

a housing;

an anode body that is surrounded by the housing;

an anode contact projecting out of an inside of the anode body;

an adhesion layer; and a cathode contact proceeding along an upper side of the anode body, the cathode contact having its housing side coated with the adhesion layer;

wherein the cathode contact is formed of a ferriferous material of a system carrier.

6. The capacitor according to claim 1, wherein the cathode contact is configured in a sheet metal strip shape.

7. The capacitor according to claim 1, wherein the adhesion layer is galvanically applied on the cathode contact.

8. The capacitor according to claim 1, wherein the adhesion layer is 0.1 through 0.5 μm thick.

9. The capacitor according to claim 1, wherein the adhesion layer comprises silver.

10. The capacitor according to claim 1, where housing over the cathode contact is 2 through 5 mm thick.

11. A method of manufacturing a capacitor, comprising:

providing a housing that surrounds an anode body;

providing the anode body with an anode contact projecting out of an inside of the anode body;

providing a cathode contact proceeding along an upper side of the anode body; and providing an adhesion layer arranged between and in direct contact with the cathode contact and the housing to improve adhesion between the cathode contact and the housing.

* * * * *